C. H. PIXLEY.
NEUTRALIZING CELL AND AXIS INDICATOR.
APPLICATION FILED MAY 22, 1911.
1,015,269.
Patented Jan. 16, 1912.
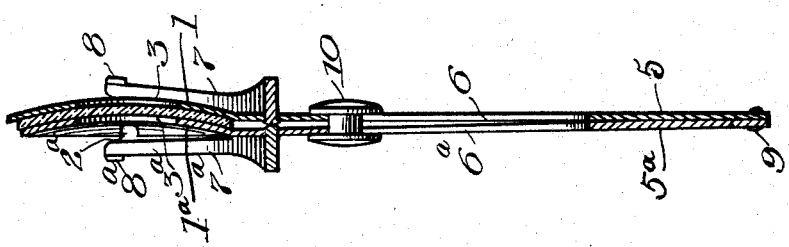
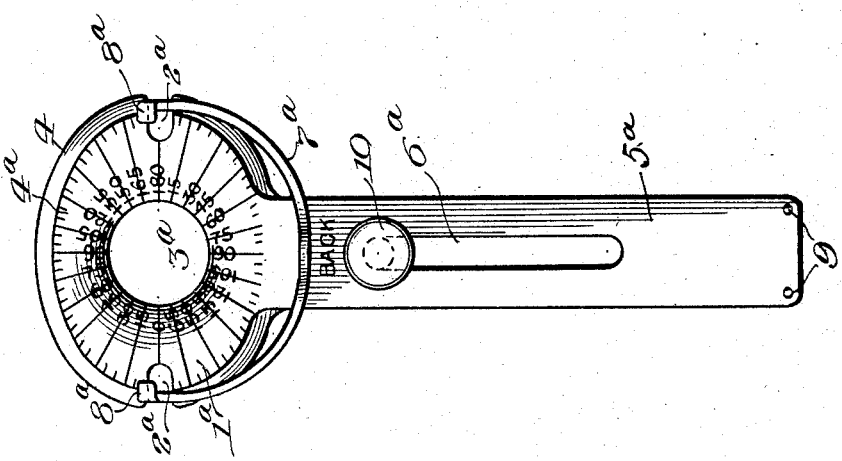
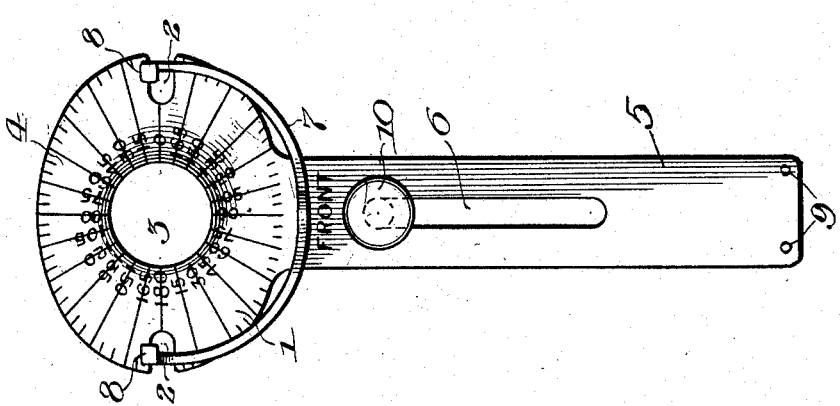

UNITED STATES PATENT OFFICE.

CHARLES HENRY PIXLEY, OF CHICAGO, ILLINOIS, ASSIGNOR TO F. A. HARDY & COMPANY, A CORPORATION OF ILLINOIS.

NEUTRALIZING-CELL AND AXIS-INDICATOR.

1,015,269.  Specification of Letters Patent.  Patented Jan. 16, 1912.

Application filed May 22, 1911. Serial No. 628,707.

*To all whom it may concern:*

Be it known that I, CHARLES HENRY PIXLEY, a citizen of the United States, and a resident of Chicago, in the county of Cook and State of Illinois, have invented a new and useful Neutralizing-Cell and Axis-Indicator, of which the following is a specification.

My invention relates to the provision of a frame or cell which shall have facilities for holding the lens to be examined either unmounted or mounted as in eye-glasses or spectacles; which shall be so formed as to facilitate the easy and accurate location of the diametrical axes of the lens with respect to the instrument; and which shall have provision for supporting test lenses in suitable known relation to the lens under examination, whereby the strength of the lens and location of the cylindrical axes may be determined.

I effectuate the above objects by the device illustrated in the accompanying drawing, in which:

Figure 1 is a front elevation; Fig. 2 is a back or rear elevation; and Fig. 3 is a central longitudinal section.

Similar reference numerals refer to similar parts throughout the several views.

The reference numeral 1 designates the front lens holding plate, the outline of which is the same as that usually given to spectacle or eye glass lenses, and which is of the size of the largest of such lenses as are generally in use, so that the lens may be properly located in the instrument by placing the lens so that its periphery is just in line or parallel with the periphery of the plate. The plate 1, is concaved slightly from the rear so as to better accommodate a lens of a dished or toric form.

At opposite sides of the plate are provided cut away areas, 2, to accommodate the studs of a mounted lens, and in the center is the opening, 3, through which the lens is observed. About the central opening the plate is provided with scales, 4, in degrees running from right to left above and from left to right below the horizontal axis.

From the central portion of the lower edge of the plate, 1, extends a spring arm, 5, which has a slot, 6, longitudinally through its central portion. To the upper portion of the arm 5, is riveted, or otherwise suitably secured, the central portion of a semi-circular spring lens clip 7, the ends of which extend upon each side of the plate and have transversely extending ears, 8, for securing a test lens.

Back of the plate, 1, and arm, 5, and secured to the lower end of said arm 5, by the rivets, 9, are the rear or back arm 5ª, and plate 1ª, which are substantially similar to the plate 1, and arm 5, except the plate 1ª, is smaller than the plate 1, and the scales 4ª are arranged in the opposite order so that the reading will be the same from whichever side the instrument is observed.

I have designated the portions of the back by similar numerals employed for like portions of the front with the letter "a" added.

The unsecured ends of the arms 5 and 5ª, are sprung outwardly or away from each other, and the double headed rivet 10 extends through the slots 6 and 6ª, so that by sliding the rivet 10 upwardly and downwardly the plates 1 and 1ª are forced together and permitted to separate in order to engage a lens between them and release it from engagement.

The plate 1ª is preferably of the size of the smallest lens in general use so that the smallest lens may be located by its periphery or any greater size may be brought parallel with the peripheries of both plates.

It will now be seen that a lens, either mounted or unmounted, may be easily located and secured between the plates 1 and 1ª, and that test lenses, inserted in the clips 7 and 7ª, may be rotated until the action of the lens is neutralized, when by noting the strength of the test lenses and reading their location upon the scales 4 and 4ª, the strength and location of the cylindrical axis of the lens are easily ascertained.

Having thus described my invention, what I claim as new and desire to secure by Letters Patent, is:—

1. A neutralizing cell and axis indicator comprising a pair of lens holding disks, central apertures therein, means for securing said disks in proximity, radial scales upon said disks about said apertures, and spring lens clips extending laterally from said disks.

2. A pair of lens holding disks shaped to accommodate a meniscus lens between them, central apertures therein, spring arms extending therefrom, means for securing the remote ends of said spring arms, a slot in said arms, a double headed bolt in said slot whereby said arms may be brought together or released, central apertures in said disks and spring lens clips extending laterally from said disks.

3. A pair of lens holding disks of unequal diameters, the peripheries whereof are given the peripheral form of the usual lenses whereby lenses may be located between said disks by bringing their peripheries parallel with the edges of either or both of said disks, central apertures in said disks, means for securing said disks in proximity and spring lens clips extending laterally in front of said disks.

In testimony whereof I affix my signature in the presence of two witnesses.

CHARLES HENRY PIXLEY.

Witnesses:
E. O. TROEGER,
BENJ. T. ROODHOUSE.

Copies of this patent may be obtained for five cents each, by addressing the "Commissioner of Patents. Washington, D. C."